United States Patent [19]

Basten et al.

[11] 4,036,441
[45] July 19, 1977

[54] PROCESS FOR RECOVERING USABLE MATERIALS FROM WASTE MATERIAL CONTAINING METALS AND NON-METALS

[75] Inventors: Albert T. Basten, Voerendaal; Hubert H. Dreissen, Geleen, both of Netherlands

[73] Assignee: Stamicarbon B.V., Geleen, Netherlands

[21] Appl. No.: 671,542

[22] Filed: Mar. 29, 1976

[30] Foreign Application Priority Data

Mar. 29, 1975 Netherlands .................... 7503809

[51] Int. Cl.² .......................................... B02C 23/10
[52] U.S. Cl. ...................................... 241/20; 241/79.1; 209/172.5; 209/211; 241/DIG. 38; 241/24
[58] Field of Search ............... 241/DIG. 38, 24, 79.1, 241/20; 209/211, 172.5

[56] References Cited

U.S. PATENT DOCUMENTS

| | | | |
|---|---|---|---|
| 2,793,748 | 5/1957 | Herkenhoff | 209/211 |
| 2,819,795 | 1/1958 | Fontein et al. | 209/211 |
| 2,829,771 | 4/1958 | Dahlstrom | 209/211 |
| 2,942,792 | 6/1960 | Anderson et al. | 241/DIG. 38 |
| 2,965,522 | 12/1960 | Crespin et al. | 209/211 |
| 3,024,909 | 3/1962 | Dahlstrom | 209/211 |
| 3,379,308 | 4/1968 | Horiuchi | 209/211 |
| 3,389,793 | 6/1968 | Leeman | 209/211 |
| 3,582,001 | 6/1971 | Rose | 241/DIG. 38 |
| 3,869,559 | 3/1975 | Clark | 209/211 |

Primary Examiner—Granville Y. Custer, Jr.
Attorney, Agent, or Firm—Cushman, Darby & Cushman

[57] ABSTRACT

The present invention relates to a process for separating scrap essentially consisting of non-ferromagnetic metals into several fractions by specific gravity in which only one heavy separating medium is required. The scrap has been recovered from waste products composed of metals and non-metals by reducing the particle size of the waste through grinding to a size less than 50 mm including particles as small as 0.5 mm. Thereafter, the ferromagnetic components are magnetically separated from the ground waste and the ground waste is fed to a primary specific-gravity separator where non-metallic components are separated from the non-ferromagnetic portion of the ground waste. Thereafter, further separation of the non-ferromagnetic portion in a secondary and, in some cases, tertiary separators is accomplished.

14 Claims, 1 Drawing Figure

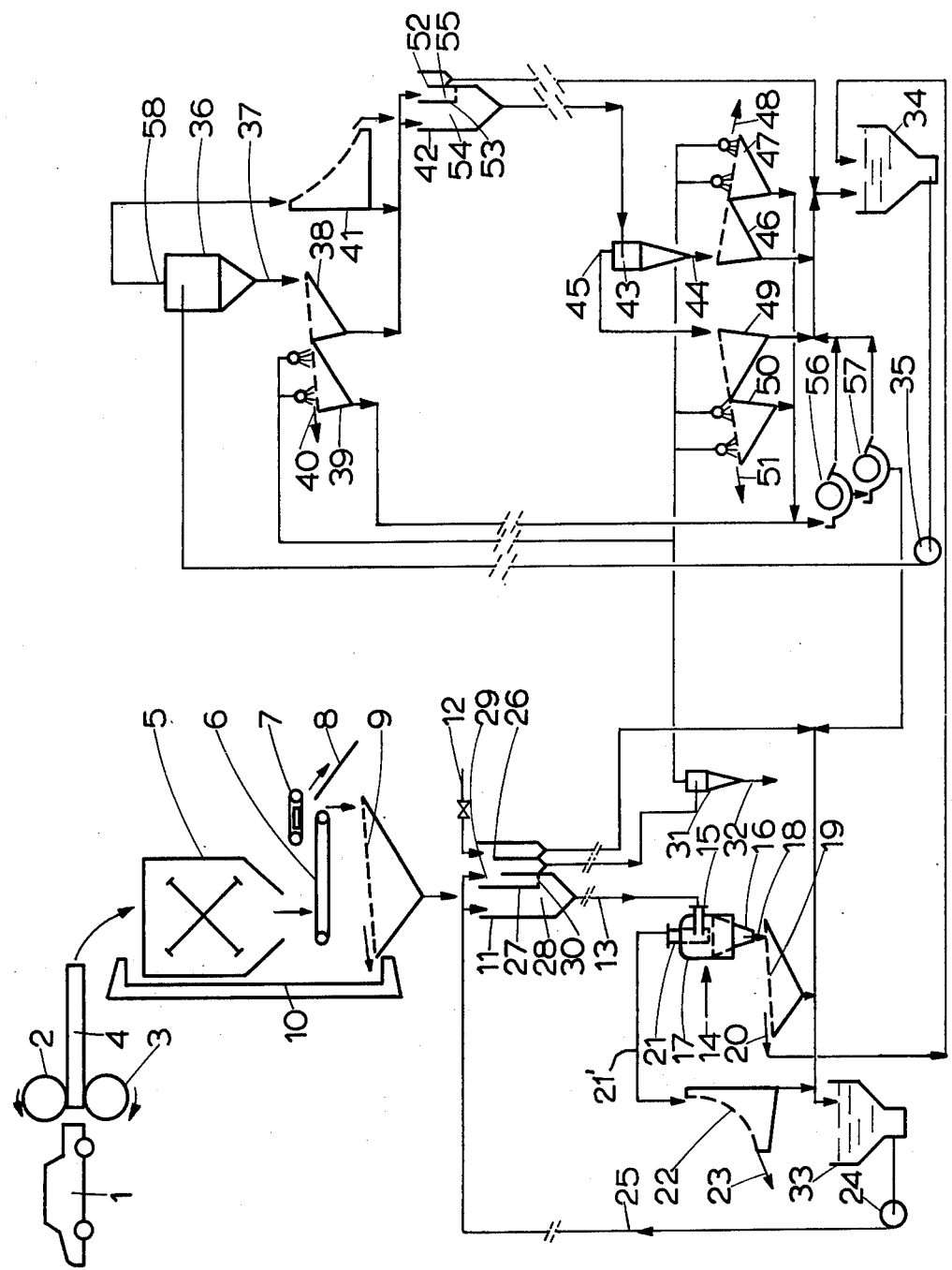

PROCESS FOR RECOVERING USABLE MATERIALS FROM WASTE MATERIAL CONTAINING METALS AND NON-METALS

BACKGROUND OF THE INVENTION

Many types of separation processes are known to have existed in the prior art. An example of one is set forth in German Auslegschrift 1,263,641, which relates to the recovery of metals from old cables and cable waste. The waste material is ground and subjected to magnetic separation; the non-magnetic fraction is thereafter separated by specific gravity in a primary float and sink apparatus, into a specific light fraction, which principally contains the insulation material, and a specific heavy fraction, which contains the non-ferromagnetic metals, for instance, copper, aluminum and lead. The separating medium is a suspension the specific gravity of which is approximately 2.0. The nonferromagnetic, mainly non-ferrous metal scrap recovered from this primary specific-gravity separation, is also separated by specific gravity in a secondary float and sink apparatus into a fraction of intermediate specific gravity, mainly consisting of aluminum alloys, and a specific heavy fraction consisting of copper, copper alloys and lead. In this secondary separation, the separating medium is a suspension having a specific gravity ranging between 2.8 to 3.0. This process, of course, is also applicable to waste products of other origin, such as discarded cars, refrigerators and other household appliances and other, domestic waste material.

Such well known separation processes, however, exhibit certain disadvantages. The most common is that for every separating step, a heavy medium of a different specific gravity is required, and each medium must be very carefully maintained. Furthermore, a float and sink separation method is not suitable for particles smaller than 6 mm, which are practically always present in an appreciable amount in such waste scrap.

The present invention is directed to a separation process in which only one heavy medium is required and which is capable of separating particles present smaller than 6 mm, down to about 0.5 mm.

According to the present invention, the non-ferromagnetic metal scrap is separated by specific gravity with the aid of a heavy, preferably aqueous, suspension having a specific gravity of at least 2.2. This is accomplished in at least one secondary hydrocyclone whose top angle of the cone-shaped part amounts to 45° to 90° and the scrap is separated into a specifically heavy fraction, mainly comprised of metals having a specific gravity of more than 3.0, which is discharged along with the suspension medium at the tip of the hydrocyclone, and a specifically lighter fraction, mainly comprised of metals having a specific gravity of less than 3.0, which is discharged along with the suspension medium at the overflow of the hydrocyclone. Thereafter, the heavy and lighter fractions are suitably separated from the suspension as by draining. The said non-ferromagnetic metal scrap is mostly comprised of non-ferrous metals, but may contain non-ferromagnetic ferrous alloys, such as certain types of stainless steel.

In the process according to the present invention, use is made of the principle that solids having different specific gravities within a mixture may be separated by specific gravity with the aid of a separating-medium under the influence of centrifugal force. To this end, as a rule, use is made of hydrocyclones. In the separation by specific gravity in a hydrocyclone, the specific gravity of separation may be considerably larger than the specific gravity of the separating-medium, depending on the dimensioning of the cyclone and on the operating conditions.

Usually, hydrocyclones of the type specified in the above are used for separating material consisting of particles having a size of no more than about 50 mm, and the hydrocyclones are mostly dimensioned to have a vortex finder, the internal diameter of which is about twice that of the tangential feed pipe, and a tangential feed pipe the internal diameter of which is about one fifth of that of the cylindrical part of the cyclone; for the separation of particles up to 50 mm an internal cyclone diameter of about 600 mm is often applied.

In the application of the process according to the present invention, it appeared that in the scrap to be treated particles having a size of more than 50 mm, up to about 70 mm, were sometimes present. The separation of particles of this size in a cyclone having the ratios of the several diameters of component parts thereof as mentioned above would require a cyclone having an unduly large diameter (about 900 mm) and would entail an unduly large circulated flow of suspension, e.g., twice the flow required by the smaller cyclone.

It was surprisingly discovered that scrap-particles in size up to 70 mm could be separated in a cyclone having a diameter normally dimensioned for particles up to only 50 mm. This discovery made the use of hydrocyclones technically and economically feasable. For the smaller cyclone to function properly, it is only necessary that the ratio of the internal diameter of the vortex finder to that of the tangential feed pipe of the secondary cyclone to be less than 1.5, e.g. 1,4 and that the ratio of the internal diameter of the feed pipe to that of the cylindrical part of the secondary cyclone be between 0.22 and 0.28, e.g. 0.25. Thus, when these ratios are applied in the design of the cyclone, a normal cyclone diameter of 600 mm can be used wherein particles up to about 70 mm can be treated and the flow of the suspension medium can have the normal value for a 600 mm cyclone.

In many cases separation into heavy alloys, such as copper alloys, and lighter alloys proves insufficient, for example, when the lighter alloys mentioned mainly comprised of aluminum-containing alloys having high silicon and magnesium contents. Metallurgical processing of such a mixture for the purpose of recovering the aluminum therefrom is difficult. It is then desirable that the lighter fraction be further separated into a fraction mainly consisting of aluminum, and a fraction comprised of alloys which are specifically lighter than aluminum. To this purpose, according to the present invention, the specifically lighter fraction, mainly comprised of metals having a specific gravity of less than 3.0, is supplied along with a suspension medium of the same composition as used in the secondary hyrocyclone to at least one tertiary hydrocyclone whose top angle of the cone-shaped part amounts to 15°–25°. A middle metal fraction mainly comprised of aluminum is discharged along with the suspension medium at the tip of the hydrocyclone and a lightest metal fraction mainly consisting of lighter metals and alloys is discharged along with the suspension medium at the overflow of the hydrocyclone. Thereafter, these middle and lightest metal fractions are separated from the suspension medium through a draining process.

Other objects of this novel process will become more apparent by referring to the following specification taken in conjunction with the accompanying drawing which shows schematically a preferred embodiment of a plant designed according to the present invention.

As will be evident, the preferred plant design will include apparatus providing the capability for primary secondary and tertiary separations.

A discarded car 1 is flattened between two rollers 2 and 3 into a bundle 4 in such a way that the car's engine block may, mainly, pass without deformation. The bundle 4 is supplied to a shredder 5 and the resulting scrap is transferred onto a conveyor 6 which carries the ground scrap past a magnetic separator 7, which separates out the ferromagnetic components from the rest of the scrap. The ferromagnetic components are then discharged via a chute 8 to a suitable collection point (not shown). The ferromagnetic component consists principally of ferroalloys and may be used as raw material in the fabrication of steel.

The remaining scrap composed of non-ferromagnetic metals, plastics, etc., is then deposited upon a screen sieve 9 of parts which are too coarse for further processing — for instance if sized over 70 mm — are returned to the shredder 5 by means of a suitable conveyor, generally indicated at 10. The portion passing through the sieve 9 is sent to a supply vessel 11. Water may be supplied to the supply vessel 11 through a line 12. By means of a line 13, a mixture of solids and water can be carried from the supply vessel 11 to the primary hydrocyclone 14. The supply vessel 11 is installed at a level which is sufficiently, e.g. about 10 m, higher than that of the hydrocyclone 14 such that the mixture of solids and water enters the hydrocyclone 14 through a tangential feed 15 with sufficient speed.

In the hydrocyclone 14 separation is effected between specifically heavier and specifically lighter parts. The first fraction, which consists of specifically heavier parts (chiefly metals, like copper- and aluminum-alloys) leaves the hydrocyclone 14 through the discharge opening at the tip 18 thereof and is dewatered on a dewatering screen 19. The second fraction, which consists of specifically lighter parts (for instance plastics and rubber) leaves the hydrocyclone 14 through the overflow tube 21 and line 21' and transported to a sieve bend 22 where it is dewatered and finally discharged at 23. The water separated of on the screens 19 and 22 is collected in a pump sump 33 and sent back to the supply vessel 11 with the aid of a pump 24 through a line 25.

The supply vessel 11 has an overflow 26 for the purpose of maintaining a constant water pressure at the feed 15 of the cyclone 14. To this end, by preference, use is made of a supply vessel as described in the Dutch Patent Sepcification 96,726. In this case a vertical baffle 27 is installed in the supply vessel 11, which baffle divides the supply vessel into two compartments 28 and 29. Through the aperture 30 the compartment 29 is connected with the compartment 28. Part of the water recycled via the line 25 is, with the solids, fed to compartment 28, the remainder of the recycled water being sent to compartment 29, in such a ratio that the downward velocity of the water through the aperture 30 is so large that no light materials can reach the overflow 26 which connects with the compartment 29.

Fine components will accumulate in the recycled process water. In order to avoid too great a concentration of fine particles, part of the recycling process water is passed through a cyclone-thickener 31; the purified water is used again, the thickened fraction being discharged at 32.

Preferably, the primary hydrocyclone 14 is of the type in which the cone-shaped part 16 may be axially adjusted relative to the cylindrical part 17.

The first fraction leaving the draining screen 19 at 20 is supplied to a mixing vessel 34 in which it is taken up by a heavy suspension medium of finely ground ferrosilicon in water, having a specific gravity of about 2.45. The mixture of the heavy suspension medium and metal parts from the first fraction is passed by a pump 35 to a secondary hydrocyclone 36 whose top angle of the cone-shaped part amounts to 60°. In one embodiment the diameter of the cyclone 36 is 600 mm, the diameter of the feed pipe is 150 mm and the diameter of the vortex finder is 210 mm. At the discharge opening at the tip 37 of the cyclone, a specifically heavy fraction, comprised of parts with a specific gravity of over about 3.15, is discharged along with the suspension medium (mainly copper and copper alloys), which fraction is drained of the suspension medium on a draining screen 38 and a rinsing screen 39 and is discharged at 40. Through the overflow line 58 of the secondary hydrocyclone 36, a specifically lighter fraction is discharged along with the suspension medium and largely drained of the suspension medium on a sieve bend 41. The lighter fraction, together with the suspension medium from the draining screen 38 and the sieve bend 41, is sent to a supply vessel 42 from which the mixture is passed to a tertiary hydrocyclone 43. In this tertiary hydrocyclone 43, whose top angle of the cone-shaped tip amounts to 20°, the lighter fraction is separated into a middle metal fraction, which mainly consists of parts having a specific gravity of over 2.65, and which is discharged along with the suspension medium at the discharge opening at the tip 44 thereof, and a lightest metal fraction, which is mainly comprised of parts having a specific gravity below 2.65, which is discharged at the overflow 45 of the hydrocyclone 43. The middle fraction comprises chiefly of aluminum; it is drained of the suspension medium on a draining screen 46 and a rinsing screen 47 and discharged at 48. The lightest fraction, which contains the lighter metals and alloys, is drained of the suspension medium on a draining screen 49 and a rinsing screen 50 and discharged at 51.

The supply vessel 42 is installed at a sufficient height (e.g. about 10 m) above the hydrocyclone 43 which together with an overflow 52 provide the required constant liquid pressure at the feed of the tertiary hydrocyclone 43. Supply vessels 11 and 42 are of the same type as the vessel described in Netherlands Patent Specification 96,726, and the action of supply vessel 42 is similar to vessel 11 which has already been discussed above. The supply vessel 42 is divided by a partitioning baffle 53 into two compartments 54 and 55. The lighter fraction coming from the sieve bend 41 is supplied to the compartment 54, while the suspension medium separated off by the sieve bend 41 and the draining screen 38 is distributed over both compartments 54 and 55 in such a ratio that no floating parts can reach the overflow 52. In order that the suspension medium can be distributed over the compartments 54 and 55 in the proper ratio, it must be separated from the solid parts, which is the function carried out by the sieve bend 41. The suspension medium coming from the draining screens 46 and 49 and the overflow 52 is returned to the mixing vessel 35. On the rinsing screens 39, 47, and 50 the purified water obtained at the overflow of the cyclone-thickener 31 is used as spraying water. The diluted suspension medium from the rinsing screens 39, 47 and 50 is regenerated with two series-connected magnetic separators 56 and 57. The regenerated magnetic fraction is passed to the mixing vessel 34, while the water is separated off and directed to the pump sump 33 for the process water to be used in the primary hydrocyclone 14. In this way part of the water is continuously withdrawn from the suspension circuit and led through the process water circuit of the primary cyclone 14, part of which, in turn, is led through the cyclone-thickener 31. In this manner, therefore, accumulation of fine parts is also avoided in the suspension medium cycle.

The drawing shows the parts ncessary for a proper understanding of the invention. It should be understood, however, that conventional parts such as means for controlling the specific gravity of the suspension medium and means for circulating the liquid streams have not been shown. Further, additional pumps could be employed at points not indicated by the diagram, and instead of single hydrocyclones, cyclone batteries may be used.

Variants to the diagram shown are possible. For the feed of the secondary hydrocyclone 36, for instance, a similar supply vessel may be used as the supply vessels 11 and 42 for the primary and tertiary cyclones 14 and 43. If such a supply were used, it would have to be installed at a sufficient height above the second hydrocyclone 36, so as to provide proper flow pressures. In that case the non-ferromagnetic scrap to be subjected to secondary separation will be raised by a separate conveyor (not shown) and the suspension medium vessel 34 would no longer perform the function of a mixing vessel.

Further, the suspension medium discharged from the draining screen 38 and the sieve bend 41 may be returned directly to the vessel 34 and the suspension medium required for the supply vessel 42 could be supplied from the vessel 34 by a separate pump. A mixing vessel and a separate pump may be used for feeding the tertiary hydrocyclone 43 instead of the supply vessel 42, analogously to the mixing vessel 34 and the pump 35 for the secondary hydrocyclone 36. In addition, the liquid circuit of, on the one hand, the primary hydrocyclone 14 and, on the other, the secondary and tertiary hydrocyclones 36 and 43 may be kept fully separate and the secondary/tertiary circuit be provided with conventional separate desludging devices. Additionally, instead of an aqueous heavy suspension medium, a heavy suspension medium with a liquid other than water as suspension medium agent may be used. These variations and others of this kind are regarded as forming part of the essence of the invention; the preferential embodiment represented, however, is the most attractive economically.

It has already been indicated above, that in the process according to the present invention, use is made of the phenomenon known as such that in separation by specific gravity in a hydrocyclone the specific gravity of separation may be larger than the specific gravity of the separating medium applied. The difference in specific gravity may be rather large, for instance about 0.7 and more, in the case of a cyclone with a relatively large top angle of the cone-shaped part, as the secondary hydrocyclone indicated above. In the case of a cyclone with a relatively small top angle, as the tertiary hydrocyclone indicated above, this difference is much smaller as a rule, for instance about 0.2, all this depending also on the further dimensions of the cyclone and on the process conditions.

A cyclone with a relatively large top angle involves the drawback that the sharpness of separation is not as good. In the process according to the present invention, however, the top angle of the cyclone does not exhibit this drawback because of the specific gravity distribution of the material being processed. This forms an essential feature of the present invention, which will be elucidated in more detail in the following table.

The table shows the specific gravity distribution of the non-ferromagnetic part of a type of motorcar scrap which is to be considered representative of the type of waste scrap being processed by the present invention.

Table

| specific gravity fraction | specific gravity | percent by weight | fraction designation |
|---|---|---|---|
| A | < 1.78 | 20 | non-metal fraction |
| B | 1.78–2.65 | 23 | lightest fraction |
| C | 2.65–2.79 | 14 | middle fraction |
| D | > 3.32 | 39 | heavy fraction |

The fraction A mainly contains the non-metals, fraction B is comprised of the light metals and alloys, while fraction C is comprised practically completely of aluminum. Fraction D contains the heavier metals, chiefly copper and copper alloys. Material having a specific gravity of between 2.79 and 3.32 is present in only a very small quantity.

The fraction A is separated from fractions B, C and D by a primary specific-gravity separation, with fractions B, C and D constituting the mainly non-ferrous metals to be separated into several fractions. Supposing that secondary and tertiary hydrocyclones are used and that in the secondary and tertiary hydrocyclones a suspension having a specific gravity of 2.45 is applied, separation can be effected in the secondary cyclone at a specific gravity of 3.15 and in the tertiary cyclone at a specific gravity of 2.65. The value of 3.15 lies within the range of from 2.79 to 3.32, within which only very little material is present. Notwithstanding that the separation is less sharp, the separation of the fraction D (heavy fraction) from the fractions B and C (the lighter fractions) in the secondary hydrocyclone is accomplished with only a minor amount of impurities. The lighter fraction is separated further in the tertiary hydrocyclone which is a cyclone having a relatively small top angle and capable of satisfactorily separating the fractions B and C whose specific gravities are close to each other. In this way the middle metal fraction C and the lightest metal fraction B are separated.

For stripping the heavy, middle and lightest fractions from the suspension medium, draining and rinsing screens are usually used. The suspension medium separated off on the draining screens may be recycled, but the diluted suspension medium from the rinsing screens must be regenerated.

For composition of the heavy, aqueous suspension medium use is made by preference of a ferromagnetic weighting agent, for instance, ferrosilicon; for regeneration of diluted suspension medium use is made in that case of magnetic separators. In principle, however, also a non-magnetic weighting agent such as barite may be used with other known appropriate means for regeneration of the suspension medium.

When separation of lightest and middle metal fractions is not deemed necessary, or when the scrap only contains a negligible amount of the lightest alloys, the tertiary separating step can be omitted and only the primary and secondary cyclones are used.

Preferably, when both secondary and tertiary hydrocyclones are used, the specifically lighter fraction and heavy suspension medium are passed to a supply vessel with an overflow device with the supply vessel being installed sufficiently higher than the tertiary hydrocyclone that the mixture of the suspension medium and the scrap fraction can be supplied to the tertiary hydrocyclone with sufficient speed. Also, the heavy suspension medium passed to the supply vessel is preferably composed of the suspension medium which is discharged together with the specifically lighter fraction at the overflow of the secondary hydrocyclone and of the suspension medium which is withdrawn on a draining screen from the mixture of the specifically heavy fraction and the suspension medium discharged at the tip of the secondary hydrocyclone. Due to the irregular form of the scrap, the rinsing action of the various rinsing screens may not be sufficient to free substantially all the particles of weighting material from conglomerates of scrap particles. If this is the case, the rinsing may be combined with a more vigorous washing action wherein the step of draining the metal fractions of the suspension comprises submerging said metal fractions in a washing liquid (usually water); to this end use may be made e.g., of a partly submerged rotating drum screen. The primary separation by specific gravity is preferably carried out with the aid of at least one primary hydrocyclone in which water is applied for separating medium, with the non-ferrous metals being discharged along with the water at the tip of the cyclone. The non-metallic components will be discharged along with the water at the overflow of the cyclone. Thereafter, both fractions are dewatered. A process and apparatus for such a primary separation is described (and claimed) in a copending U.S. patent application Ser. No. 640,209, filed Dec. 12, 1975.

An installation for performing the primary separation need not be located together with an installation for performing the secondary and tertiary separation; it may be desirable to separate non-metallic waste and ferro magnetics near the place where, e.g., discarded cars are collected, and centrally performing the further separation(s) for a number of such collecting places.

If, however, the primary, secondary and, as the case may be, tertiary separation are performed at the same locality, and the primary separation is carried out in a hydrocyclone with water as a separating medium, as mentioned above, the process water used in the primary hydrocyclone can be wholly or partly recycled and accumulated fine impurities can be removed from at least part of the circulating water in a known manner with at least one cyclone-thickener. In that case, preferably at least part of the purified water obtained at the overflow of the cyclone-thickener is used as sprayingwater on rinsing screens, on which the specifically heavy and/or specifically lighter and/or middle metal and/or lightest metal fractions are drained of any adhering suspension medium. The diluted suspension medium coming from such rinsing screens is supplied to means for regeneration of the suspension medium, and the water withdrawn by these means from the diluted suspension medium is added to the process water to be used in the primary hydrocyclone.

The present invention also relates to an installation for separating scrap essentially consisting of non-ferromagnetic metals into two fractions by specific gravity, which scrap has been recovered from waste products composed of metals and non-metals by treatment in a primary installation comprising means for reducing the size and grinding the waste, means for magnetically separating ferromagnetic components from the ground waste and a primary specific gravity separator for separating non-metallic components from the non-ferromagnetic portion of the ground waste.

According to the present invention, the installation comprises at least one secondary hydrocyclone whose top angle of the cone-shaped part amounts to 45° to 90°, means for having the non-ferromagnetic metal scrap taken up by a heavy suspension medium and conveyed with this suspension medium to at least one secondary hydrocyclone. The installation can further be provided with draining and rinsing screens for draining the fractions discharged at the discharge-opening at the tip of the secondary hydrocyclone and at the overflow of the secondary hydrocyclone, and also means for regeneration of the diluted suspension medium.

Preferably, the ratio of the internal diameter of the vortex finder to that of the tangential feed pipe of the secondary cyclone is less than 1.5, and that the ratio of the internal diameter of the feed pipe to that of the cylindrical past of the secondary cyclone is between 0.22 and 0.28.

The present invention also relates to an installation for separating scrap essentially consisting of non-ferromagnetic metals into three fractions by specific gravity, which scrap has been recovered from waste products composed of metals and non-metals by treatment in a primary installation comprising means for reducing in size and grinding the waste, means for magnetically separating ferromagnetic components from the ground waste and a primary specific-gravity separator for separating non-metallic components from the non-ferromagnetic portion of said ground waste.

According to the present invention, the installation comprises at least one secondary hydrocyclone whose top angle of the cone-shaped part amounts to 45° to 90° and, connected in series with the secondary hydrocyclone, at least one tertiary hydrocyclone whose top angle of the cone-shaped part amounts to 15° to 25°, means for having the non-ferrous metal scrap taken up by a heavy suspension medium and conveyed with this suspension medium to the secondary hydrocyclone or hydrocyclones as is deemed desirable and means to have the fraction discharged at the overflow of the secondary hydrocyclone supplied to at least one tertiary hydrocyclone. The heavy suspension medium is of the same composition as the medium used in the secondary hydrocyclone, and draining and rinsing screens are also used to drain the fractions discharged at the discharge-opening at the tip of the secondary hydrocyclone, at the overflow of the tertiary hydrocyclone and the discharge-opening at the tip of the tertiary hydrocyclone together with means for regeneration of the diluted suspension medium discharged from the rinsing screens.

Preferably, the ratio of the internal diameter of the vortex finder to that of the tangential feed pipe of the secondary cyclone is less than 1.5, and the ratio of the internal diameter of the feed pipe to that of the cylindrical past of the secondary cyclone is between 0.22 and 0.28.

The present invention also relates to plant for recovering materials from waste products composed of metals and non-metals, such as discarded cars and car wrecks, which plant comprises a primary installation for recovering scrap essentially consisting of non-ferromagnetic metals from the waste products, comprising means for reducing in size and grinding the waste, a magnetic separator for separating ferromagnetic components from the ground waste and a primary specific-gravity separator for separating non-metallic components from the non-ferromagnetic portion of the ground waste, and an installation for separating the scrap recovered in the primary installation into several fractions, as described in the above.

According to the present invention the primary specific gravity separator comprises at least one primary hydrocyclone, which is equipped with a supply vessel with an overflow arrangement to which ground waste, from which the ferromagnetic components have been separated with the magnetic separator, and water can be supplied. Again, this supply vessel is installed higher than the primary hydrocyclone so that the mixture of water and ground waste can be fed to the cyclone with sufficient speed. Also included is a first dewatering screen for dewatering the first fraction discharged at the tip of the hydrocyclone, and a second dewatering screen for dewatering the second fraction discharged at the overflow of the hydrocyclone. The first fraction is essentially comprised of non-ferromagnetic metals and the second fraction is essentially comprised of non-metals.

If such plant is equipped with means for wholly or partly recycling the process water used in the primary hydrocyclone and with at least one cyclone-thickener to which at least part of the circulating water is supplied, preferably the overflow of the cyclone-thickener is connected with at least part of the sprayers of the rinsing screens of the secondary and/or tertiary hydrocyclones, and in that the discharge for the water separated off by the means for regeneration of the diluted suspension is connected with the means for recycling the process water.

It will now be clear that thre is herein provided a process and system which accomplishes the objectives heretofore set forth. While the present invention has been disclosed in a preferred form, it is to be understood that the specific embodiment thereof, as described and illustrated, is not to be considered in a limited sense as there may be other forms or modifications which should also be considered as coming within the scope of the appended claims.

What is claimed is:

1. A process for separating scrap comprised of non-ferromagnetic metals into several fractions by specific gravity, which scrap has been recovered from waste products composed of metals and non-metals in a preliminary treatment, said preliminary treatment comprising the steps of grinding said waste and reducing the particle size to a size ranging up to about 50 mm, magnetically separating ferromagnetic components from the ground waste and separating by a primary specific-gravity separation non-metallic components from the non-ferromagnetic metallic portion of the ground waste, the said process comprising the steps of mixing said non-ferromagnetic metallic portion with a heavy, preferably aqueous suspension medium having a specific gravity of at least 2.2, feeding said mixture to a secondary specific-gravity separator comprising a hydrocyclone having a top angle of the cone-shaped part ranging between 45° to 90°, separating the non-ferromagnetic portion into first and second portions, discharging the first portion comprised of the suspension and a specifically heavy fraction from the tip of the secondary hydrocyclone, said heavy fraction comprised of metals having a specific gravity of more than 3.0, discharging the second portion comprised of the suspension and a specifically lighter fraction from the overflow of the hydrocyclone, said lighter fraction comprised of metals having a specific gravity of less than 3.0, and draining the suspension away from the heavy and lighter fractions.

2. The process as claimed in claim 1, wherein said reduced scrap contains particles having a size ranging up to about 70 mm, and wherein the ratio of the internal diameter of the vortex finder to that of the tangential feed pipe of the secondary hydrocyclone is less than 1.5, and the ratio of the internal diameter of the feed pipe to that of the cylindrical part of the secondary hydrocyclone between 0.22 and 0.28.

3. The process according to claim 1, further including the step of mixing the lighter fraction comprised of metals having a specific gravity of less than 3.0 with a suspension medium of the same composition as in said secondary hydrocyclone, feeding said mixture to at least one tertiary specific-gravity separator comprising a hydrocyclone having a top angle of the cone-shaped part ranging between 15° to 25°, separating the lighter fraction, discharging from the tip of the tertiary hydrocyclone, a portion of the suspension medium together with a middle metal fraction comprised of aluminum, discharging from the overflow of the tertiary hydrocyclone another portion of the suspension medium together with a lightest metal fraction comprised of lighter metals and alloys and draining the suspension medium away from the middle and lightest fractions.

4. The process according to claim 3, wherein the specifically lighter fraction and heavy suspension medium are passed to a supply vessel provided with an overflow, and wherein the supply vessel is mounted higher than the tertiary hydrocyclone so that the mixture of the suspension medium and the lighter fraction is supplied to the tertiary hydrocyclone at a predetermined, constant pressure.

5. The process according to claim 4, wherein the heavy suspension passed to the supply vessel is composed of the suspension medium which is discharged together with said specifically lighter fraction at the overflow of the secondary hydrocyclone and of the suspension medium which is drained from the material discharged at the tip of the secondary hydrocyclone.

6. The process as claimed in claim 3, wherein the primary specific-gravity separation includes the steps of mixing the ground waste from which the ferromagnetic component has been removed with a separating medium comprised of water, feeding the mixture to at least one primary hydrocyclone, separating the components in the mixture, discharging from the tip of the primary hydrocyclone a portion of the separation medium together with the nonferromagnetic metal portion of the ground waste, discharging from the overflow of the primary hydrocyclone another portion of the separating medium together with non-metallic components within the ground waste and draining the separating medium from the separated portions of the ground waste.

7. The process as claimed in claim 6 including the additional steps of recycling the water used in the primary hydrocyclone by passing at least part of the water through at least one cyclone-thickener, discharging accumulated fine impurities from the tip of the cyclone-thickener, discharging purified water from the overflow of the cyclone-thickener, spraying the purified water on the desired draining metal fractions, regenerating the diluted suspension medium used in the secondary and tertiary hydrocyclones drained from the portions separated therein, and collecting the water withdrawn during the regenerating for use in the primary hydrocyclone.

8. The process as claimed in claim 1, wherein the primary specific-gravity separation includes the steps of mixing the ground waste from which the ferromagnetic component has been removed with a separating medium comprised of water feeding the mixture to at least one primary hydrocyclone, separating the components in the mixture, discharging from the tip of the primary hydrocyclone a portion of the separation medium together with the non-ferromagnetic metal portion of the ground waste, discharging from the overflow of the primary hydrocyclone another portion of the separating medium together with non-metallic components within the ground waste and draining the separating medium from the separated portions of the ground waste.

9. The process as claimed in claim 8 including the additional steps of recycling the water used in the primary hydrocyclone by passing at least part of the water through at least one cyclone-thickener, discharging accumulated fine impurities from the tip of the cyclone-thickener, discharging purified water from the overflow of the cyclone-thickener, spraying the purified water on the desired draining metal fractions, regenerating the diluted suspension medium used in the secondary hydrocyclone drained from the portions separated therein, and collecting the water withdrawn during the regenerating for use in the primary hydrocyclone.

10. The process according to claim 1, wherein the step of draining the metal fractions of the suspension includes the additional step of submerging the metal fractions in a washing liquid.

11. The process according to claim 1, wherein the waste products comprise discarded cars or parts thereof.

12. An installation for separating scrap comprised of non-ferromagnetic metals into several fractions by specific-gravity, which scrap has been recovered from waste products composed of metals and non-metals by treatment in a primary installation comprising means for reducing in size and grinding said waste so as to produce particles ranging in size up to about 70 mm, means for magnetically separating ferromagnetic components from the ground waste and a primary specific-gravity separator for separating non-metallic components from the non-ferromagnetic portion of said ground waste, said installation in combination with said primary installation comprising at least one secondary specific-gravity separator comprising a hydrocyclone having a top angle of the cone-shaped part ranging between 45° to 90°, means for mixing said non-ferromagnetic metal scrap together with a heavy suspension medium to form a mixture thereof, means for conveying this mixture to at least one said secondary hydrocyclone, first suspension medium recovery means for collecting heavy medium for direct mixing with said non-ferromagnetic metal scrap and second suspension medium conveying means for recovery of dilute suspension medium, said second recovery means including draining screens and rinsing screens positioned respectively adjacent the discharge-opening at the tip of the secondary hydrocyclone and at the overflow of the secondary hydrocyclone in order to drain the suspension from the discharged fractions and regeneration means for regeneration of the diluted suspension medium from the rinsing screens wherein the ratio of the internal diameter of the vortex finder to that of the tangential feed pipe of the secondary cyclone is less than 1.5, and wherein the ratio of the internal diameter of the feed pipe to that of the cylindrical part of the secondary cyclone is between 0.22 and 0.28.

13. An installation for separating scrap comprised of non-ferromagnetic metals into several fractions by specific gravity, which scrap has been recovered from waste products composed of metals and non-metals by treatment in a primary installation comprising means for reducing in size and grinding said waste, so as to produce particles ranging in size up to about 50 mm, means for magnetically separating ferromagnetic components from the ground waste, a primary specific-grvity separator for separating non-metallic components from the non-ferromagnetic portion of said ground waste, said installation in combination with said primary installation comprising at least one secondary hydrocyclone having a top angle of the cone-shaped part between 45° to 90° and, connected in series with said secondary hydrocyclone, at least one tertiary hydrocyclone having a top angle of the cone-shaped part between 15° to 25°, means for mixing said non-ferromagnetic metal scrap together with a heavy suspension medium to form a mixture thereof, means for conveying this suspension medium to said secondary hydrocyclone and means for supplying the fraction discharged at the overflow of said secondary hydrocyclone to said tertiary hydrocyclone together with a heavy suspension medium of the same composition as in said secondary hydrocyclone, draining screens and rinsing screens positioned so as to receive the fractions discharged at the discharge-opening at the tip of said secondary hydrocyclone, at the overflow of said tertiary hydrocyclone and the discharge-opening at the tip of said tertiary hydrocyclone, and means for regenerating the diluted suspension withdrawn from said rinsing screens.

14. An installation according to claim 13, wherein the ratio of the internal diameter of the vortex finder to that of the tangential feed pipe of said secondary cyclone is less than 1.5, and wherein the ratio of the internal diameter of the feed pipe to that of the cylindrical part of said secondary cyclone is between 0.22 and 0.28.

* * * * *